(12) United States Patent
Hertzfeld et al.

(10) Patent No.: US 8,909,203 B1
(45) Date of Patent: Dec. 9, 2014

(54) DISRUPTION BLOCKING IN MOBILE DEVICES

(71) Applicant: Google Inc., Mountain View, CA (US)

(72) Inventors: Andrew J. Hertzfeld, Palo Alto, CA (US); Mathias Marc Agopian, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/854,644

(22) Filed: Apr. 1, 2013

Related U.S. Application Data

(63) Continuation of application No. 13/747,961, filed on Jan. 23, 2013, now Pat. No. 8,611,272, which is a continuation of application No. 13/616,831, filed on Sep. 14, 2012, now Pat. No. 8,433,291, which is a continuation of application No. 11/871,695, filed on Oct. 12, 2007, now Pat. No. 8,385,884.

(51) Int. Cl.
*H04W 4/08* (2009.01)
*H04W 4/16* (2009.01)

(52) U.S. Cl.
CPC ...................... *H04W 4/16* (2013.01)
USPC .................... 455/414.1; 348/14.01

(58) Field of Classification Search
CPC ....... H04W 12/06; H04W 4/02; H04W 60/00; H04M 1/677; H04N 7/147
USPC ........... 455/411, 565, 414, 435, 414.1, 435.1; 348/14.01
See application file for complete search history.

(56) References Cited

U.S. PATENT DOCUMENTS

| | | | |
|---|---|---|---|
| 5,812,648 A | 9/1998 | Wanner | |
| 7,430,441 B2 | 9/2008 | Nagahama et al. | |
| 8,340,263 B2 * | 12/2012 | Rondeau et al. | 379/201.01 |
| 2002/0193124 A1 | 12/2002 | Hamilton et al. | |
| 2004/0203794 A1 | 10/2004 | Brown et al. | |
| 2005/0153747 A1 * | 7/2005 | Egami et al. | 455/567 |
| 2006/0009265 A1 | 1/2006 | Clapper | |
| 2006/0063563 A1 | 3/2006 | Kaufman | |
| 2006/0105800 A1 * | 5/2006 | Lee | 455/550.1 |
| 2006/0160562 A1 | 7/2006 | Davis et al. | |

OTHER PUBLICATIONS

Office Action issued in U.S. Appl. No. 11/871,695 on Aug. 19, 2010, 11 pages.
Office Action issued in U.S. Appl. No. 11/871,695 on Dec. 8, 2010, 12 pages.
Office Action issued in U.S. Appl. No. 11/871,695 on May 26, 2011, 9 pages.
Office Action issued in U.S. Appl. No. 13/616,831 on Nov. 7, 2012, 8 pages.
Notice of Allowance issued in U.S. Appl. No. 11/871,695 on Nov. 11, 2012, 8 pages.
Notice of Allowance issued in U.S. Appl. No. 13/616,831 on Jan. 15, 2013, 20 pages.
Office Action issued in U.S. Appl. No. 13/247,961 on Sep. 17, 2013, 19 pages.
Notice of Allowance issued in U.S. Appl. No. 13/247,961 on Oct. 17, 2013, 9 pages.
Notice of Allowance issued in U.S. Appl. No. 13/747,961 on Oct. 17, 2013, 9 pages.

* cited by examiner

*Primary Examiner* — Phuoc H Doan
(74) *Attorney, Agent, or Firm* — Fish & Richardson P.C.

(57) ABSTRACT

A do not disturb (DND) mode for telephonic devices, in which the DND mode is automatically deactivated after a time increment has elapsed, the DND mode having been activated based on detecting, upon receiving a telephone call, a selection of the control.

24 Claims, 11 Drawing Sheets

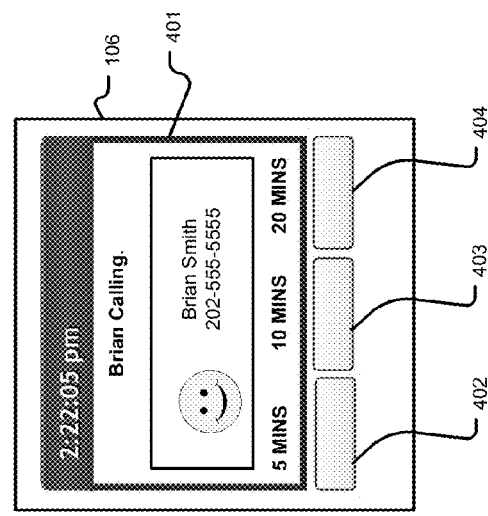
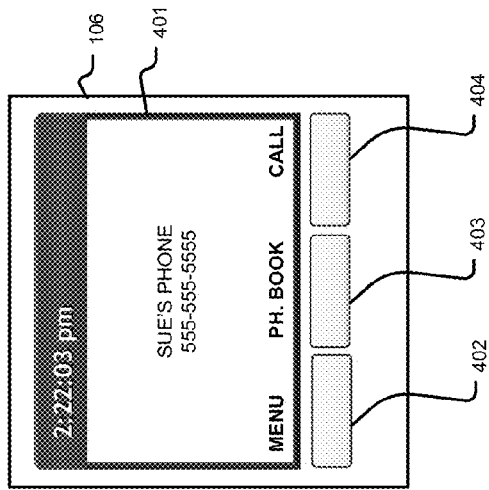
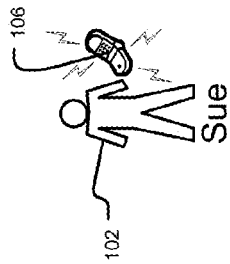
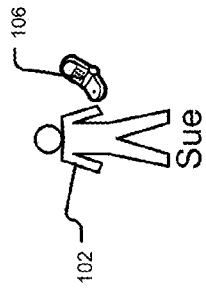
FIG. 4A
FIG. 4B

DISRUPTION BLOCKING IN MOBILE DEVICES

CROSS REFERENCE TO RELATED APPLICATION

This application is a continuation application of U.S. patent application Ser. No. 13/747,961. Filed Jan. 23, 2013, which is a continuation application of U.S. patent application Ser. No. 13/616,831, filed Sep. 14, 2012, which is a continuation application of U.S. patent application Ser. No. 11/871,695, filed Oct. 12, 2007. The disclosure of which are incorporated herein by reference.

FIELD

The present disclosure generally relates to telephony.

BACKGROUND

Within recent memory, mobile telephones have evolved from a rare curiosity into a widely-available, indispensable business tool and social necessity. Many people view the rapid development of these products as a general societal advance. As with other conveniences, however, many other people view these devices as a nuisance, because they are capable of filling otherwise serene locales, or moments of quiet reflection, with annoying rings and inane conversation.

SUMMARY

A user of a mobile device such as a cellular telephone may block intrusions for a time period by providing a "do not disturb" command to his or her device. Use of such a command may cause the device, for a set time period, to not bother the user when a call is incoming, and to provide the caller with an indication of the user's activity. For example, the device may inform the caller that the user will not be available until the end of the set time period. The device may provide on-screen feedback when the device is in a "do not disturb" mode, such as by providing a countdown of how much time is remaining before the device will revert to a normal mode.

According to one general implementation, a method includes automatically deactivating a do not disturb (DND) mode after a time increment has elapsed, the DND mode having been activated based on detecting, upon receiving a telephone call, a selection of a control.

According to another general implementation, a method includes detecting, upon receiving a telephone call, a selection of a control, and determining a time increment associated with the selected control. The method also includes activating a DND mode based on the selection, and automatically deactivating the DND mode after the time increment has elapsed.

Implementations may include one or more of the following features. For example, the control may be a physical button or an on-screen button on a device receiving the telephone call. Before receiving the telephone call, the control may implement a first function, and, upon receiving the telephone call, the control may implement a second function associated with activating the DND mode. Upon receiving the telephone call, a user interface including the control may be generated. The time increment may be determined based on a number of times the selection of the control has been detected, or the time increment may be user selectable.

In additional examples, data indicative of the time increment may be transmitted to a call originator. Specifically, a profile of the call originator may be accessed, and it may be determined whether to send the data indicative of the time increment to the call originator based on the profile. The data indicative of the time increment may be transmitted to the call originator further based on determining whether to send the data indicative of the time increment to the call originator. The selection may be a user selection by a called party. The time increment may be a predetermined time increment or a dynamically determined time increment.

In further examples, it may be determined whether an appointment occurs before the time increment has elapsed, the appointment including an appointment time and an appointment attendee. If the appointment occurs before the time increment has elapsed, a meeting delay may be determined based on comparing the time increment with the appointment time, such that, if the appointment occurs before the time increment has elapsed, data indicative of the determined meeting delay is transmitted to the appointment attendee. The data indicative of the determined meeting delay may be transmitted to the appointment attendee via a text message.

Moreover, in additional examples, in the DND mode a telephone ringer module may be set to 'off' or 'vibrate,' the telephone call may be directed to voicemail, or a device receiving the telephone call may be powered off or placed in a stand-by or a hibernate mode. An indicator signal may be output based on activating or deactivating the DND mode. The DND mode may be manually deactivated before the time increment has elapsed. Detecting the selection of the control may further include detecting the selection of the control while a device is ringing. It may also be determined whether the time increment has elapsed. Detecting the selection of the control further may further include detecting an abrupt motion, such as a slap, a smack, a shake, or a flip, using an accelerometer.

According to another general implementation, a computer program product is tangibly embodied in a machine-readable medium. The computer program product includes instructions that, when read by a machine, operate to cause a data processing apparatus to detect, upon receiving a telephone call, a selection of a control, and to determine a time increment associated with the selected control. The computer program product further includes instructions that, when read by the machine, operate to cause the data processing apparatus to activate a DND mode based on the selection, and to automatically deactivate the DND mode after the time increment has elapsed.

According to another general implementation, a device includes a input module and a processor. The input module is configured to detect, upon receiving a telephone call, a selection of a control. The processor is configured to determine a time increment associated with the selected control, to activate a DND mode based on the selection, and to automatically deactivate the DND mode after the time increment has elapsed.

According to another general implementation, a device includes means for detecting, upon receiving a telephone call, a selection of a control, and means for determining a time increment associated with the selected control. The device further includes means for activating a DND mode based on the selection, and means for automatically deactivating the DND mode after the time increment has elapsed.

According to another general implementation, a method includes determining a time increment associated with an event. The method also includes activating a do-not-disturb mode based on the event, and automatically deactivate the do-not-disturb mode after the time increment has elapsed.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 4A and 4B depict a portion of an exemplary device surrounding a display, in a state just before receiving a telephone call and upon receiving the telephone call, respectively.

Like reference numbers represent corresponding components throughout.

DETAILED DESCRIPTION

Generally, a calling party (or 'call originator,' 'caller,' or 'A-party') is a person that initiates a telephone call, for example by dialing a telephone number. Conversely, a called party (or 'call recipient' or 'callee') is a person or device that receives a telephone call.

Telephone calls are generally placed through one or more networks, such as a Public Switched Telephone Network (PTSN) provided by one or more traditional commercial telephone company or by a cellular network of base stations provided by a commercial mobile telephone company, as extended in various ways, such as by the Internet, private cellular telephone networks, and other such networks. A telephone call is initiated when a calling party dials or otherwise transmits a telephone number or other unique identifier of the called party. Through various mechanisms, the network receives the unique identifier of the called party, and generates the telephone call. The telephone call is received when the called party is alerted of the incoming call, where the alert provides a user with the opportunity to answer or otherwise accept the telephone call. A telephone call is still received by the called party, even if the called party elects to not answer or otherwise accept the telephone call.

Figure 1:
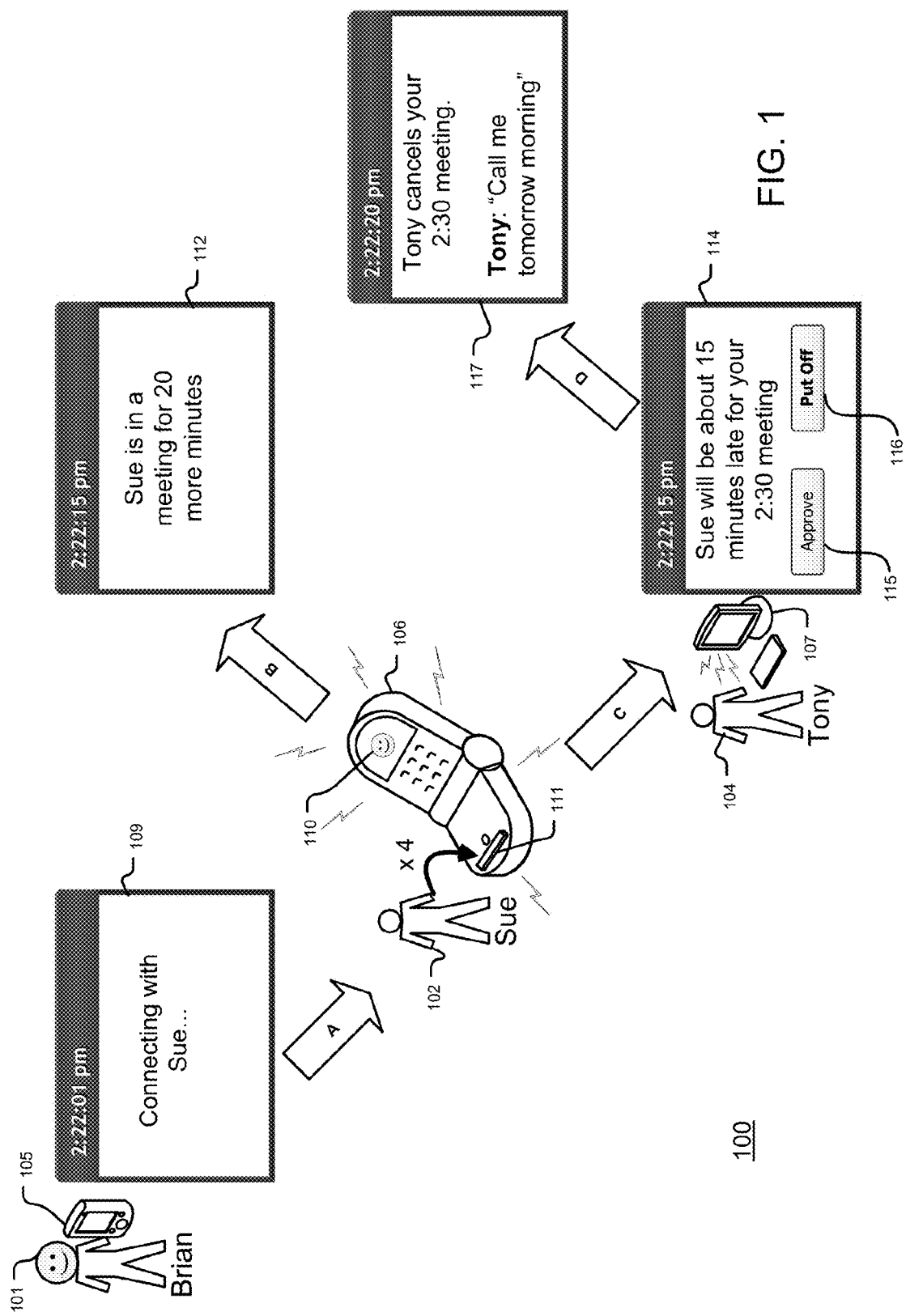
FIG. 1 is a conceptual diagram of a system for activating and deactivating a DND feature.

FIG. 1 is a conceptual diagram of a system 100 for activating and deactivating a DND feature. In particular, FIG. 1 illustrates communication between a calling party 101 ("Brian"), a called party 102 ("Sue"), and a third party appointment attendee 104 ("Tony"), in various states.

Using a personal digital assistant 105 that includes telephone or telephony capabilities, Brian dials Sue's mobile phone 106 at 2:22:01 pm. Tony, who is using a computer 107, is expecting to meet with Sue at 2:30:00 pm, and is thus a external party or third party to the telephone call, and an appointment attendee of the contemplated meeting with Sue. A user interface 109 on Brian's personal digital assistant 105 reflects the time and status of the outgoing or initiated telephone call.

A few seconds later, after the telephone network processes the telephone number data transmitted by Brian, Sue's mobile phone 106 rings upon receiving the telephone call (i.e. immediately or very soon after receiving the telephone call, or on the occasion of receiving the telephone call).

When the telephone call is received at the mobile phone 106, calling party information 110, such as a telephone number, picture, or profile information of the calling party is displayed if available. For example, the network or carrier that the mobile phone 106 operates on may provide a caller identification ("caller ID" or automated number identification (ANI)) service that provides the telephone number and/or other data identifying the call originator. Using this information, the mobile phone 106 may access and display other calling party information that may be stored on the phone 106. In FIG. 1, for example, the calling party information 110 displayed on the mobile phone 106 includes a picture of Brian.

Sue, who is in a meeting and may not wish to be disturbed for (in her best estimation at the time) another twenty minutes, touches "5 minute snooze" control 111 on the mobile phone 106. The control 111 is a physical button that places the mobile phone 106 into a temporary DND mode, in a manner similar to how a "snooze button" deactivates an alarm on an alarm clock for a predetermined period of time. Thus, the DND mode is activated based on detecting, upon receiving a telephone call, a selection of the control 111.

Because the control 111 is a "5 minute snooze" control associated with a five minute time increment, and unlike snooze buttons on conventional alarm clocks, Sue selects the control four times to set a DND time increment of twenty minutes. Because the control 111 is a physical button, Sue has the ability to select the control on the basis of feel, for example while the mobile phone 106 is ringing in her pocket or purse, allowing her to quickly activate the DND mode without fumbling or otherwise requiring her undue attention. Similar touch-based activation may occur, for example, where the phone 106 is provided with an accelerometer, and shaking, smacking, slapping, flipping or jerking of the phone 106 can indicate that the user wishes to invoke a DND command. The accelerometer input can represent different commands for different inputs. For instance, a slap (i.e. an abrupt or sharp blow to the mobile phone) may cause a five minute DND time increment to be set, a spin or flip may cause a ten minute DND time increment to be set or cause the mobile phone to enter a hibernate mode, or a shake may cause the phone to enter a non-temporary silent mode.

The activation of the DND mode modifies one or more preset or programmable behaviors of the mobile phone 106. For example, when the DND mode is activated, the ringer may be silenced, all incoming calls may be blocked or directed to voicemail, the mobile phone 106 may be placed into vibrate, hibernate or stand-by mode or powered off, or any other action may occur that absolutely or selectively minimizes disturbance of the mobile phone 106 to Sue.

The device automatically deactivates the DND mode after the time increment selected by Sue, which in this case is twenty minutes. Thus, the DND mode is automatically deactivated after a time increment has elapsed.

On activating the DND mode, the mobile phone 106 determines whether to send data indicative of the time increment to Brian, the calling party 101. In this example, because Brian's stored profile indicates that he is a friend and thus has a sufficient permission level, the mobile phone 106 sends (via short message service (SMS) or any other mechanism) the personal digital assistant 105 data indicating that Sue has activated the DND mode for another twenty minutes. A user interface 112 on the personal digital assistant 105 displays this data to Brian, at time 2:22:15 pm.

In various configurations, or based on data-sharing settings, the data indicative of the time increment can describe the duration of the selected time increment, either vaguely or in detail, or it can merely describe the activation of the DND mode. For example, if Brian were a stranger or untrusted acquaintance to Sue, the mobile phone 106 may not send any data indicative of the time increment at all, or may merely send data, such as text data, indicating "CALL AGAIN LATER," "DO NOT DISTURB MODE ACTIVATED," or "NOT AVAILABLE."

In certain situations, a caller may be given an opportunity to "break through" to a callee. For example, if the caller is part of a defined group of close friends, the caller may respond to the message received from the callee, in order to indicate to the callee that there is an emergency. Such a response may cause the callee to receive an SMS message, or may cause the callee's phone 106 to ring again, perhaps with a different, more urgent, ring tone.

Upon checking a stored appointment calendar, as triggered by activation of DND mode, the mobile phone 106 determines that Sue's selected time increment of twenty minutes will overlap an appointment at 2:30:00 pm that she has scheduled with Tony, by approximately eighteen minutes. The appointment calendar is kept current when Sue enters her appointments directly into the mobile phone 106, or when Sue synchronizes her telephone with other scheduling software, such as MICROSOFT® OUTLOOK® scheduling software, on her primary computing device. Sue's activation of DND mode may allow the phone 106 to infer that Sue will be consumed in whatever she is currently doing throughout the DND period, and will thus be unable to make the meeting with Tony on time.

The mobile phone 106 determines whether to send data indicative of this determined meeting delay to Tony, the appointment attendee 104, and further determines what level, type, or accuracy of data should be sent as well. In this example, because Tony's stored profile indicates that he is a business colleague and has the appropriate permission level, the mobile phone 106 sends (via SMS) the computer 107 data indicative of the determined meeting delay.

If a contacts database for the phone 106 contains only e-mail contact information for Tony, an e-mail message may be sent. Rules may be established on phone 106 to determine which mode of communication to use when multiple modes are available. Although Sue will be eighteen minutes late for the appointment, the mobile phone 106 rounds that meeting delay to fifteen minutes in the indication that is sent to Tony. Upward rounding may also be used in all situations, or other rounding approaches may also be used.

At time 2:22:15 pm, approximately 15 seconds after Brian's initial call was placed, a user interface 114 on Tony's computer 107 displays a message indicating that Sue will be about fifteen minutes late for the meeting. Using the user interface 114, Tony may elect to accept the delay, by selecting a control 115, or to cancel the meeting, by selecting a control 116. When Tony selects the control 116, the computer 117 sends a message to the device 106 indicating that the meeting has been cancelled, as well as a personal message from Tony. This message is displayed via user interface 117 on the mobile phone 106, at time 2:22:20 pm.

Thus, the mobile phone 106 is provided with a physical or virtual button or control 111 that, when pressed one or more times, causes a ringing phone to enter a temporary DND mode. The duration of this mode may be based on the number of times that the control 111 is pressed and the time increment associated with the control, or with other indications such as the length of time the button is hold down, or which button, out of several available buttons, is pressed. During the period of time that the mobile phone 106 is in this mode, incoming calls may be directed to voicemail, or the ringer may be turned off or placed in a silent or vibrate mode. Unlike other telephones which merely allow a user to silence a ringer permanently (or until manually reactivated), this enhanced mobile phone 106 automatically deactivates the DND mode once the duration has elapsed.

Based upon a user profile, the mobile phone 106 may alert the call originator 101 to the activation of the DND mode, allowing the call originator 101 to plan a future call. Furthermore, the mobile phone 106 may check a schedule of the called party 102 to determine whether future appointments are scheduled before the duration of the DND mode elapses, and alert a meeting participant or appointment attendee 104 to the unavailability of the called party 102. Since the duration is manually selected by the called party based upon an expected delay length, the called party 102 may also manually deactivate the DND mode if the actual delay length turns out to be less than expected.

Figure 2:
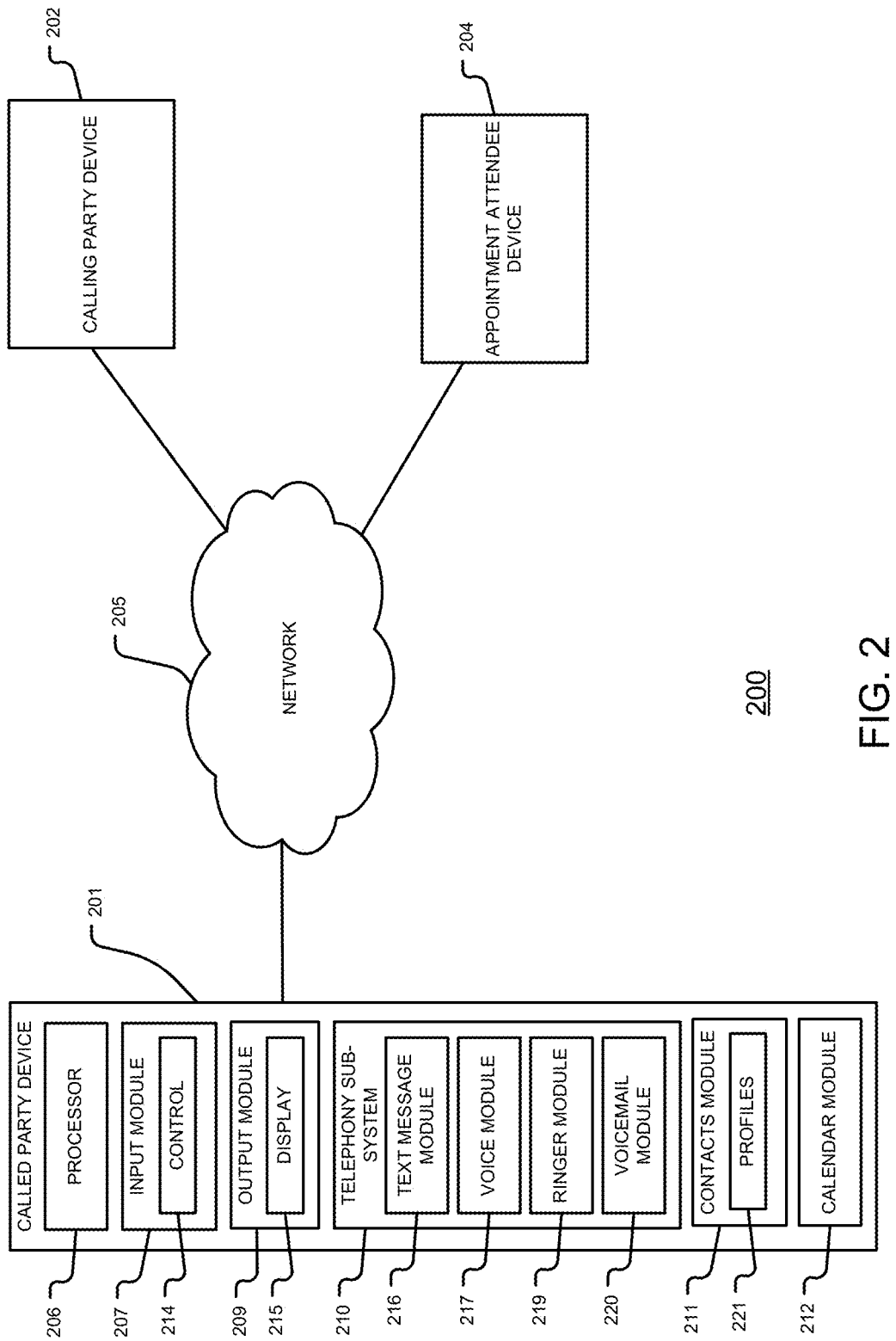
FIG. 2 is a block diagram of an exemplary system.

FIG. 2 is a block diagram of an exemplary system 200 that is used to provide automatic deactivation of a DND mode for a telephonic device. The system 200 includes a called party device 201, a calling party device 202, and an appointment attendee device 204, connected by way of a network 205. The called party device 201 is a telephonic device.

The called party device 201 includes a processor for processing computer instructions; an input module 207 for receiving input from a user; an output module 209 for generating output to the user; a telephony subsystem for provide voice or data communication by connecting the device 201 to other telephonic devices over a network; a contacts module 211 for maintaining and managing profiles 221 of the user of the device 201, calling parties, and other entities; and a calendar module 212 for maintaining and managing the schedule of the called party via direct entry of appointments or synchronization with other scheduling software.

In further detail, the input module 207 includes, receives input from, and/or generates at least one control 214, such as a physical button, on-screen control, or an accelerometer-based input, that is capable of being automatically or manually selected. Among other components, the output module 209 includes a display 215, which may be a touch screen display. The telephony sub-system further includes a text message module 216 that enables the device 201 to send and receive text or SMS messages; a voice module that enables the device 201 to communicate voice data; a ringer module 219 that alerts the user of the device 201 to incoming telephone calls through audio, visual, or tactile outputs; and a voicemail module 220 that enables the device 201 to interact with and route incoming telephone calls to a carrier-provided voicemail system.

Although further description of the calling party device 202 and the appointment attendee device 204 are omitted for the sake of brevity, in many cases these devices will have similar components as the called party device 201 such as a processor 206, an input module 207, and an output module 209. In the cases where the three devices are the same type of device, compatibility is assured, allowing communication between these devices to be deemed more reliable, and further permitting more enhanced functions to be provided or enabled.

Finally, in other implementations, one or more of these devices may be omitted, or the functions of disparate devices may be combined, such as the case where the calling party is also the appointment attendee who is calling to confirm an upcoming appointment. In that case the functions of the calling party device 202 and the appointment attendee device 204 would be performed by one device. In addition, certain of the functionality discussed here as being performed on a mobile device may also, or alternatively, be performed on a server that communicates with the device.

Figure 3:
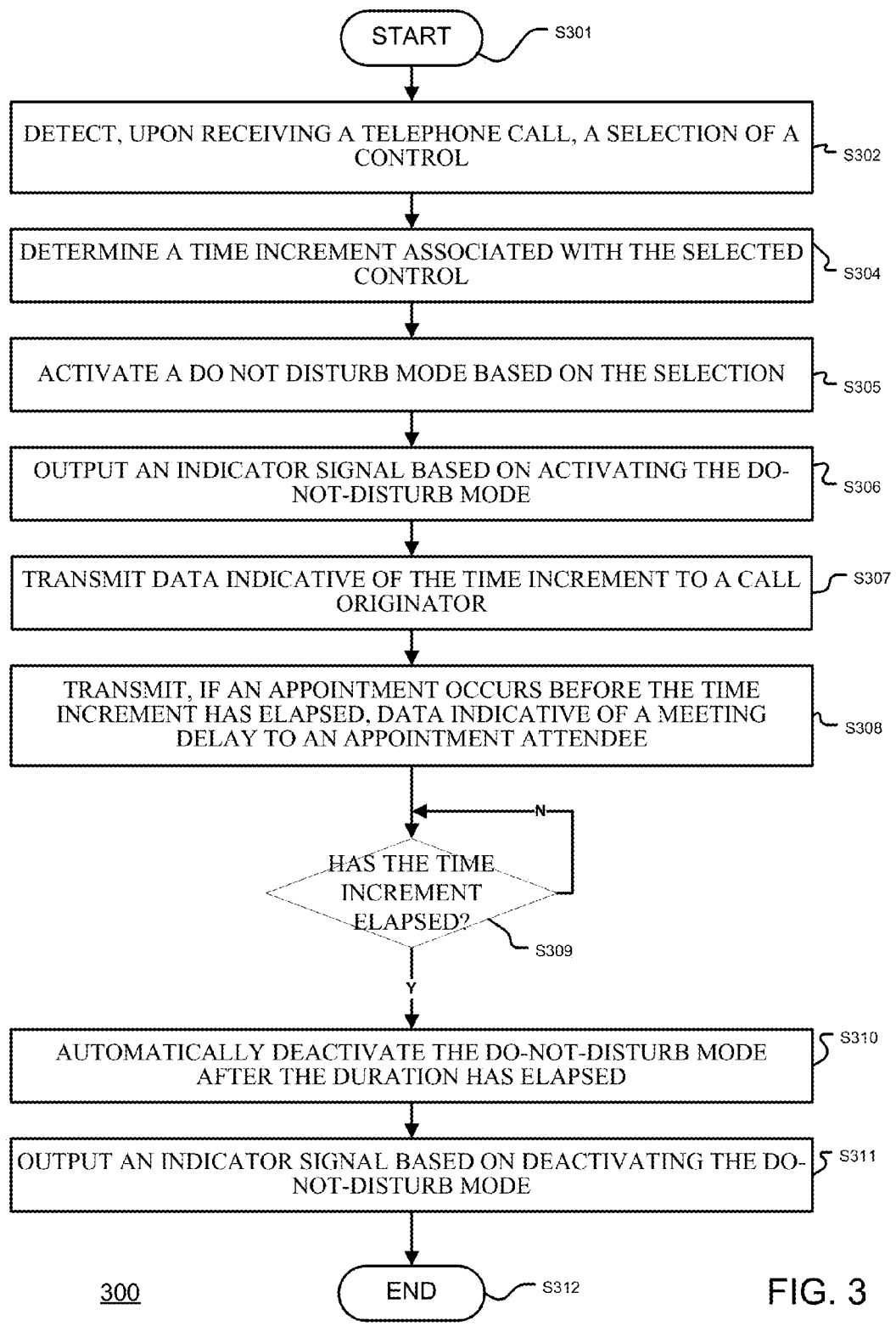
FIG. 3 is a flowchart illustrating an exemplary process.

FIG. 3 is a flowchart illustrating an exemplary process 300, according to another general implementation. Briefly, the process 300 includes detecting, upon receiving a telephone call, a selection of a control, determining a time increment associated with the selected control, activating a DND mode based on the selection, and automatically deactivating the DND mode after the time increment has elapsed.

In more detail, process 300 begins (S301) when, upon receiving a telephone call, a selection of the control 214 is detected (S302). The selection of the control 214 may be detected, for example when a physical button or an on-screen button on the device 201 receiving the telephone call is selected by the called party.

When the ringer module 219 alerts the user to the incoming telephone call, the user may determine that they do not want to be interrupted by telephone calls for a certain period of time. Based upon a known or estimated duration that they should not be interrupted by the device 201, the user may then select the control 214 one or more times to specify a time increment or duration that the DND mode will be activated. The control 214 may be selected before the device 201 begins to ring, while the device 201 is ringing, after the device 201 has ceased ringing, or while communicating on an accepted or answered telephone call.

In the case where the control is an on-screen control or a "soft" physical button located adjacent to the display 215 whose selection has different effects based upon software settings, a user interface may be generated upon receiving the call. This user interface may include the control itself, such as by defining a region of a touch-screen as the control, or the user interface may label or otherwise provide context to a physically adjacent soft button. By providing soft buttons to activate the DND mode, it may be relatively easier to alter the time increments associated with each respective button, since a physical button may also be physically labeled with (and may thus be permanently constrained by) an identified time increment.

Referring ahead briefly, FIG. 4A depicts a portion of the device 106 surrounding a display 401, in a state just before receiving a telephone call. The device includes soft buttons 402 to 404, whose function is determined based on a state of the software executing on the device 401. For instance, before receiving the call, the display 401 displays MENU adjacent to soft button 402, PH. BOOK adjacent to soft button 403, and CALL adjacent to soft button 404. In this state, a selection of soft buttons 402 to 404 would implement a menu function, a phone book function, and a telephone call function, respectively.

FIG. 4B depicts a portion of device 106 surrounding the display 401, upon receiving the telephone call. In this state, the display 401 displays 5 MINS adjacent to soft button 402, 10 MINS adjacent to soft button 403, and 20 MINS adjacent to soft button 404. As such, a selection of soft buttons 402 to 404 would signal a DND mode time increment of five minutes, ten minutes, or twenty minutes, respectively.

While the telephone call is being received, for example when the device 106 is ringing, the selection of the soft button 403 would not activate a phone book function, but would rather cause the DND mode to be activated for a time increment of ten minutes. Thus, before receiving the telephone call, the control may implement a first function, and, upon receiving the telephone call, the control may implement a second function associated with activating the DND mode.

Similar to the selection of a multi-function "soft" physical button, the control may be a physical button that has an commonly ascribed function at times other than during the reception of a telephone call, and a function associated with the DND mode upon receiving the telephone call. Upon receiving an incoming telephone call, for example, the SPACEBAR key may be associated with DND mode activation instead of the commonly ascribed function of outputting a space character.

Because the SPACEBAR key, the ENTER key, or the SHIFT keys are physically larger than most other keys, and have a unique shape, they would be easier for a user to locate and press quickly, primarily using their sense of feel. The same may be true of buttons provided on the outside of a device, such as on the device's edges or front face. In doing so, the appropriate control could be selected without actually looking at or examining the device, allowing the control to be selected while the user is in the dark, or while the device is within a bag or item of clothing.

Figure 5:
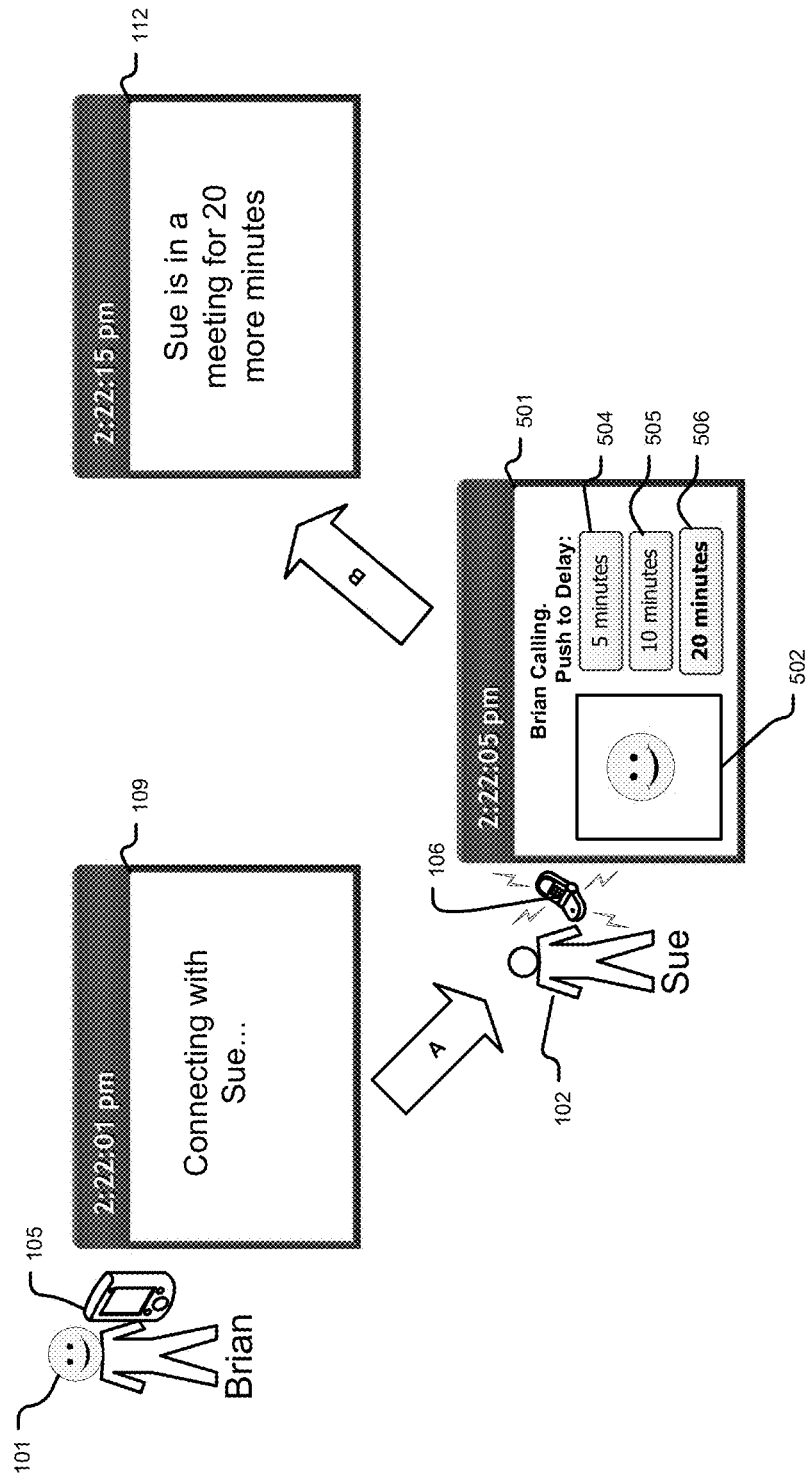
FIG. 5 is a conceptual diagram of a system for activating and deactivating a DND feature.

FIG. 5 is a diagram that presents an overview of an exemplary system that provides for the automatic deactivation of a DND mode for a telephonic mobile phone device 106, using an on-screen or virtual button or control. Similar to FIG. 1, and as displayed in user interface 109, communication begins when the calling party 101 (Brian) initiates a telephone call using personal digital assistant 105, to call the mobile phone device 106 of the called party 102 (Sue).

Instead of receiving a selection of a physical button, however, the mobile phone device 106 receives a selection of an on-screen control. In particular, upon receiving the telephone call, the mobile phone device 106 generates a user interface 501 that includes, among other things, information 502 identifying the calling party 101, and on-screen controls 504 to 506 that are associated with 5, 10 and 20 minute time increments, respectively.

The called party 102 selects the control 506 by touching her finger or using another pointing device to select a portion of a touch screen display defined by the control 506, causing the DND mode to be activated for a time increment of twenty minutes. Thus, before receiving the telephone call, the on-screen controls 504 to 506 are not displayed at all but, upon receiving the telephone call, the on-screen controls are generated for selection by the user.

Returning to FIG. 3, a time increment associated with the selected control is determined (S304). The selection of the control, or each selection of the control, affects the duration that the DND mode is active. Therefore, by associating a time increment with the control, the user of the called party device 201 may choose a control to select, or choose a number of times to select the control, based upon their knowledge or estimation of how long the DND mode should remain active. As such, the user may choose a different control to select, or may select a control a greater number of times, as their estimate increases. The time increment may be user selectable or set-able.

In one example, the user may not wish to be disturbed by their called party device 201 because they are in a meeting. When making an estimate regarding the duration that the DND mode should remain active, the user take many factors into account, such as the present time, the scheduled meeting end time, the personality of the people who are attending the meeting, their desire to receive an interruption, the importance of those who may be calling, and the time increments associated with the controls. In another example, where the device 201 is ringing during a meeting or other important conversation, the user may select the control 214 one or more times just to silence the device, knowing that they can deactivate the DND mode manually at a later, more appropriate time.

In one example configuration, the time increment associated with a control may be predetermined or fixed, such as where a single physical button is associated with a six minute time increment. A called party device 201 that utilizes this configuration may only allow the user to select this physical button once per time increment, such that the DND mode resets at the end of each time increment, or the user may be allowed to select this physical button multiple times to proactively set a longer time increment. For example, the user may select the physical button three times, to set an eighteen minute increment.

Alternatively, each subsequent selection of the physical button may be associated with an increased or reduced time increment, such that the first selection sets a six minute time increment, the second selection adds an additional five minute time increment, a third selection adds a four minute time increment, et cetera. The time increment may be output as a signal from the control itself, or the processor may query a look-up table or other database to determine the appropriate time increment associated with the control, based on any number of conditions.

In another example configuration, the time increment associated with a control may be dynamically controlled, either automatically or by a user selection. For instance, the user can type the number '9' into a keypad and then select the control, thereby setting a nine minute time increment. Additionally, by selecting the control, the called party device 201 may determine the remaining time until the next appointment via the calendar module 212, and set the time increment based on this remaining time.

In a further example configuration, the user may select a setup option to associate different, correlating or non-correlating time increments with different soft keys. For example, the user can assign a 31 second time increment, a 1 minute time increment, a 8 minute 37 second time increment, and a 16 hour time increment to four different soft keys. Any of these approaches or other approaches for statically or dynamically, manually or automatically associating a time increment with a control, may be used.

A DND mode is activated based on the selection (S305). The DND mode changes one or more behaviors of the called party device 201. For instance, in the DND mode, a telephone ringer module may be set to 'off' or 'vibrate,' the telephone call or subsequent calls may be directed to voicemail, or the called party device 201 may be powered off. The changed behaviors may be predetermined, such as by manufacturer presets. The device may also provide on-screen feedback when the device is in a "do not disturb" mode, such as by providing a countdown of how much time is remaining before the device will revert to a normal mode.

Alternatively, the user may be able to select particular behaviors to change when the DND mode is activated. Although, in the above example, the behaviors that are changed in the DND mode relate to making the called party device 201 less disturbing or intrusive, that is not necessarily always the case. For instance, for various reasons, the user may change the behavior of the called party device to be even more intrusive, such as by raising the volume of the ringer, or may change a behavior that does not effect the intrusiveness of the device, such as by changing a menu font.

An indicator signal may be output based on activating the DND mode (S306). Since the activation of the DND mode may precipitously change the behavior of the called party device 201, for example by transparently diverting all calls to voicemail, the user may wish to be alerted when the DND mode is activated, or may want to be able to determine whether the DND mode is activated based upon an indicator. Accordingly, the activation of the DND mode may cause a confirmatory audio tone to be generated, a light or other indicator to be displayed, or cause the device to vibrate or otherwise interact with the user's tactile sense. In another example implementation, however, no indicator signal is generated.

Data indicative of the time increment may be transmitted to a call originator (S307). By sending data indicative of the time increment to the call originator, the call originator receives an indication that the called party is unable or unwilling to receive calls, and may further indicate when the called party estimates that they will again be available. In another general implementation, data indicative of the time increment is not transmitted to the call originator, or is selectively transmitted based on permissions of, or the profile of, the call originator.

For instance, upon activating the DND mode, the called party device 201 may determine whether to send data indicative of the time increment to the calling party by accessing the profile of the calling party. If the profile indicates that the calling party has the appropriate permissions or access level, the called party device 201 transmits data to the calling party indicating that the called party has activated the DND mode.

As such, the profile of the call originator is determined, and it is also determined whether to send the data indicative of the time increment to the call originator based on the profile. The data indicative of the time increment is thus transmitted to the call originator further based on determining whether to send the data indicative of the time increment to the call originator. In this regard, time increment data may be selectively provided to the calling party, based upon the identity of the calling party.

In various implementations, or based on data-sharing settings, the data indicative of the time increment can describe the duration of the selected time increment, either vaguely or in detail, or it can merely describe the activation of the DND mode. For example, the data indicative of the time increment may merely indicate that the DND mode is active, that the remaining time increment is 19 minutes 58 seconds, that the remaining time increment is under one hour, that the called party has selected the control three times, or the data may provide a predetermined DND message.

Data indicative of a determined meeting delay may be transmitted to an appointment attendee (S308). The data indicative of the determined meeting delay may be transmitted to the appointment attendee via a text message, such as by using text message module 216. It may be determined whether an appointment occurs before the time increment has elapsed, the appointment including an appointment time and an appointment attendee, and, if the appointment occurs before the time increment has elapsed, a meeting delay may be determined based on comparing the time increment with the appointment time, such that, if the appointment occurs before the time increment has elapsed, data indicative of the determined meeting delay is transmitted to the appointment attendee.

For example, upon checking the calendar module 212, the called party device 201 may determine that the selected time increment will overlap with the beginning of an appointment.

After detecting the existence and magnitude of the overlap, the called party device 201 determines whether to send data indicative of this determined meeting delay to an appointment attendee, using a similar permission or profile-based approach as described above. If the appointment attendee's profile indicates that he has the appropriate permissions, the called party device 201 sends the appointment attendee data indicative of the determined meeting delay. In this regard, meeting delay data may be selectively provided to meeting attendees, based upon the identity of the meeting attendee.

After activating the DND mode (S305), it is determined whether the time increment has elapsed (S309). If the time increment has not elapsed (S309), the DND mode remains activated. If the time increment has elapsed (S309), the DND mode is automatically deactivated (S310). By automatically deactivating the behaviors of the called party device 201 are restored to their non-DND mode settings, without requiring the manual interaction of the user.

Since the duration of the DND mode is set at the time the DND mode is activated, a user does not need to remember to manually deactivate the DND mode, or worry that DND mode behaviors will persist if no action is taken. An indicator signal may be output based on activating or deactivating the DND mode (S311), and the process 300 ends (S312).

Since the duration of the DND mode may be based upon a time estimate, such as the remaining time that a meeting that the called party is attending will last, it may occur that the estimated time increment is incorrect. For instance, the called party may believe that they will be in a meeting that will last for ten more minutes, and should therefore not be disturbed for ten minutes, and select a DND mode time increment of ten minutes by selecting a five-minute control twice. If the meeting lasts for more than ten minutes, the called party may discretely select the five-minute control again, based upon a new estimate of the remaining duration of the meeting.

If, however, the meeting lasts only for two additional minutes, the DND mode would ordinarily remain active for another eight minutes if no further action is taken. If the called party wants the DND mode to end sooner than eight minutes, they may select a control (which may be the same control used to activate the DND mode) to manually deactivate the DND mode. By deactivating the DND mode, device behaviors associated with DND mode are also disabled, nullified, or returned to their normal operational settings. In essence, the convenience of having a DND mode is combined with a snooze button functionality, acting to temporarily alter distracting phone behaviors for a short time, preventing these altered behaviors from permanently impact incoming calls.

Figure 6:
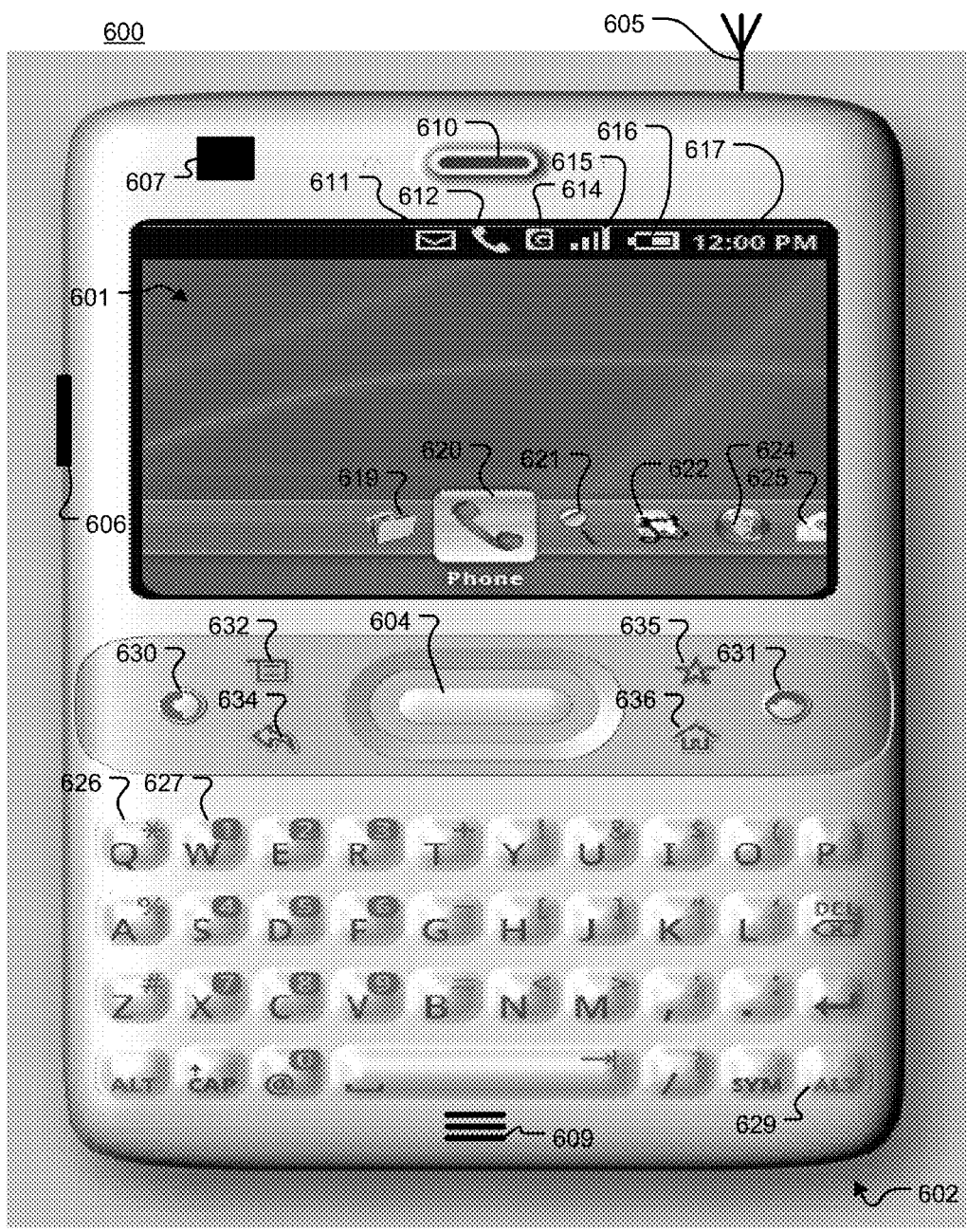
FIG. 6 is a schematic representation of an exemplary mobile device that implements embodiments of the call handling described herein.

Referring now to FIG. 6, the exterior appearance of an exemplary device 600 that implements the various features described above is illustrated. Briefly, and among other things, the device 600 includes a processor or processors configured to alert a user to an incoming call, to receive an indication from the user that they do not want to be disturbed, to place a device into a temporary DND mode in response to the user indication, and to later take the device out of the DND mode.

In more detail, the hardware environment of the device 600 includes a display 601 for displaying text, images, and video to a user; a keyboard 602 for entering text data and user commands into the device 600; a pointing device 604 for pointing, selecting, and adjusting objects displayed on the display 601; an antenna 605; a network connection 606; a camera 607; a microphone 609; and a speaker 610.

The display 601 displays video, graphics, images, and text that make up the user interface for the software applications used by the device 600, and the operating system programs used to operate the device 600. Among the possible elements that may be displayed on the display 601 are a new mail indicator 611 that alerts a user to the presence of a new message; an active call indicator 612 that indicates that a telephone call is being received, placed, or is occurring; a data standard indicator 614 that indicates the data standard currently being used by the device 600 to transmit and receive data; a signal strength indicator 615 that indicates a measurement of the strength of a signal received by via the antenna 605, such as by using signal strength bars; a battery life indicator 616 that indicates a measurement of the remaining battery life; or a clock 617 that outputs the current time.

The display 601 may also show application icons representing various applications available to the user, such as a web browser application icon 619, a phone application icon 620, a search application icon 621, a contacts application icon 622, a mapping application icon 624, an email application icon 625, or other application icons. In one example implementation, the display 601 is a quarter video graphics array (QVGA) thin film transistor (TFT) liquid crystal display (LCD), capable of 16-bit or better color.

A user uses the keyboard (or "keypad") 602 to enter commands and data to operate and control the operating system and applications that provide for putting the device into and out of a DND mode. The keyboard 602 includes standard keyboard buttons or keys associated with alphanumeric characters, such as keys 626 and 627 that are associated with the alphanumeric characters "Q" and "W" when selected alone, or are associated with the characters "*" and "1" when pressed in combination with key 629. A single key may also be associated with special characters or functions, including unlabeled functions, based upon the state of the operating system or applications invoked by the operating system. For example, when an application calls for the input of a numeric character, a selection of the key 627 alone may cause a "1" to be input.

In addition to keys traditionally associated with an alphanumeric keypad, the keyboard 602 also includes other special function keys, such as an establish call key 630 that causes a received call to be answered or a new call to be originated; a terminate call key 631 that causes the termination of an active call; a drop down menu key 632 that causes a menu to appear within the display 601; a backwards navigation key 634 that causes a previously accessed network address to be accessed again; a favorites key 635 that causes an active web page to be placed in a bookmarks folder of favorite sites, or causes a bookmarks folder to appear; a home page key 636 that causes an application invoked on the device 600 to navigate to a predetermined network address; or other keys that provide for multiple-way navigation, application selection, and power and volume control.

The user uses the pointing device 604 to select and adjust graphics and text objects displayed on the display 601 as part of the interaction with and control of the device 600 and the applications invoked on the device 600. The pointing device 604 is any appropriate type of pointing device, and may be a joystick, a trackball, a touch-pad, a camera, a voice input device, a touch screen device implemented in combination with the display 601, or any other input device.

The antenna 605 is a directional or omni-directional antenna used for the transmission and reception of radiofrequency (RF) signals that implement point-to-point radio communication, wireless local area network (LAN) communication, or location determination. The antenna 605 may facilitate point-to-point radio communication using the Specialized Mobile Radio (SMR), cellular, or Personal Communication Service (PCS) frequency bands, and may implement the transmission of data using any number or data standards. For example, the antenna 605 may allow data to be transmitted between the device 600 and a base station using technologies such as Wireless Broadband (WiBro), Worldwide Interoperability for Microwave ACCess (WiMAX), 6GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EG-PRS), Code Division Multiple Access 6000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM® MSM7200A chipset with an QUALCOMM® RTR6285™ transceiver and PM7540™ power management circuit. Alternatively, the antenna 605 may be internal to the device 600.

The wireless or wireline computer network connection 606 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 606 may connect to a LAN network, a corporate or government WAN network, the Internet, a telephone network, or other network. The network connection 606 uses a wireline or wireless connector. Example wireless connectors include, for example, an INFRARED DATA ASSOCIATION® (IrDA®) wireless connector, a Wi-Fi wireless connector, an optical wireless connector, an INSTITUTE OF ELECTRICAL AND ELECTRONICS ENGINEERS® (IEEE®) Standard 802.11 wireless connector, a BLUETOOTH® wireless connector (such as a BLUETOOTH® version 1.2 or 6.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wireline connectors include, for example, a IEEE®-1394 FIREWIRE® connector, a Universal Serial Bus (USB) connector (including a mini-B USB interface connector), a serial port connector, a parallel port connector, or other wireline connector. In another implementation, the functions of the network connection 606 and the antenna 605 are integrated into a single component.

The camera 607 allows the device 600 to capture digital images, and may be a scanner, a digital still camera, a digital video camera, other digital input device. In one example implementation, the camera 607 is a 6 mega-pixel (MP) camera that utilizes a complementary metal-oxide semiconductor (CMOS). The camera may also be associated with software to perform various functions on captured images.

The microphone 609 allows the device 600 to capture sound, and may be an omni-directional microphone, a unidirectional microphone, a bi-directional microphone, a shotgun microphone, or other type apparatus that converts sound to an electrical signal. The microphone 609 may be used to capture sound generated by a user, for example when the user is speaking to another user during a telephone call via the device 600. Conversely, the speaker 610 allows the device to convert an electrical signal into sound, such a voice from another user generated by a telephone application program, or a ring tone generated from a ring tone application program. Furthermore, although the device 600 is illustrated in FIG. 6 as a handheld device, in further implementations the device 600 may be a laptop, a workstation, a midrange computer, a mainframe, an embedded system, telephone, desktop PC, a tablet computer, a PDA, or other type of computing device.

Figure 7:
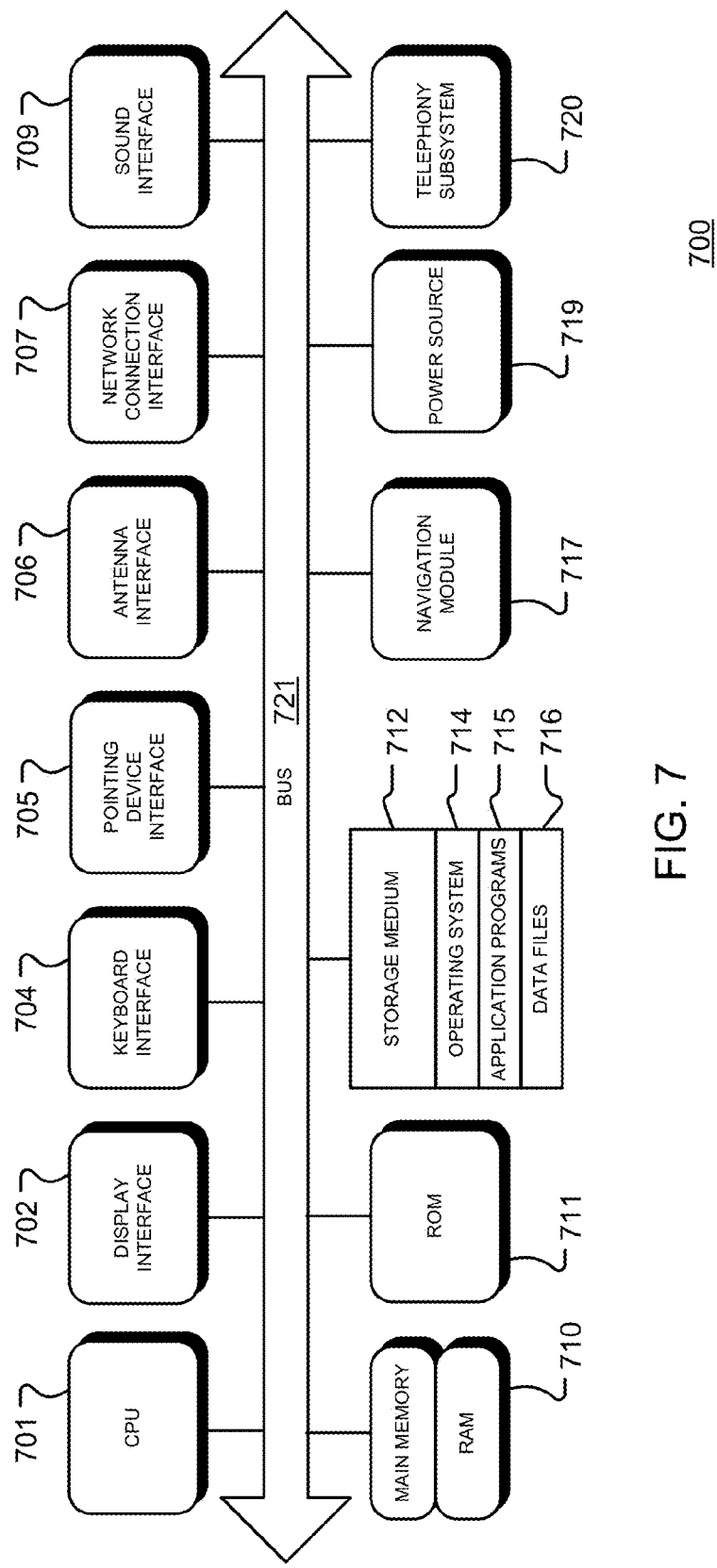
FIG. 7 is a block diagram illustrating the internal architecture of the device of FIG. 6.

FIG. 7 is a block diagram illustrating an internal architecture 700 of the device 600. The architecture includes a central processing unit (CPU) 701 where the computer instructions that comprise an operating system or an application are processed; a display interface 702 that provides a communication interface and processing functions for rendering video, graphics, images, and texts on the display 601, provides a set of built-in controls (such as buttons, text and lists), and supports diverse screen sizes; a keyboard interface 704 that provides a communication interface to the keyboard 602; a pointing device interface 705 that provides a communication interface to the pointing device 604; an antenna interface 706 that provides a communication interface to the antenna 605; a network connection interface 707 that provides a communication interface to a network over the computer network connection 606; a camera interface 709 that provides a communication interface and processing functions for capturing digital images from the camera 607; a sound interface that provides a communication interface for converting sound into electrical signals using the microphone 609 and for converting electrical signals into sound using the speaker 610; a random access memory (RAM) 710 where computer instructions and data are stored in a volatile memory device for processing by the CPU 701; a read-only memory (ROM) 711 where invariant low-level systems code or data for basic system functions such as basic input and output (I/O), startup, or reception of keystrokes from the keyboard 602 are stored in a non-volatile memory device; a storage medium 712 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 713, application programs 715 (including, for example, a web browser application, a widget or gadget engine, and or other applications, as necessary) and data files 719 are stored; a navigation module 717 that provides a real-world or relative position or geographic location of the device 600; a power source 719 that provides an appropriate alternating current (AC) or direct current (DC) to power components; and a telephony subsystem 720 that allows the device 600 to transmit and receive sound over a telephone network. The constituent devices and the CPU 701 communicate with each other over a bus 721.

The CPU 701 is one of a number of computer processors, including. In one arrangement, the computer CPU 701 is more than one processing unit. The RAM 710 interfaces with the computer bus 721 so as to provide quick RAM storage to the CPU 701 during the execution of software programs such as the operating system application programs, and device drivers. More specifically, the CPU 701 loads computer-executable process steps from the storage medium 712 or other media into a field of the RAM 710 in order to execute software programs. Data is stored in the RAM 710, where the data is accessed by the computer CPU 701 during execution. In one example configuration, the device 600 includes at least 128 MB of RAM, and 256 MB of flash memory.

The storage medium 712 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 600 to access computer-executable process steps, application programs and the like, stored on removable and non-removable memory media, to off-load data from the device 600, or to upload data onto the device 600.

A computer program product is tangibly embodied in storage medium 712, a machine-readable storage medium. The computer program product includes instructions that, when read by a machine, operate to cause a data processing apparatus to store image data in the mobile device. In some embodiments, the computer program product includes instructions that detect, upon receiving a telephone call, a selection of a control, determine a time increment associated with the selected control, activate a do-not-disturb mode based on the selection, and automatically deactivate the do-not-disturb mode after the time increment has elapsed.

The operating system 713 may be a LINUX®-based operating system such as the GOOGLE® ANDROID® operating system; APPLE® MAC OS X®; MICROSOFT® WINDOWS NT®/WINDOWS® 2000/WINDOWS® XP/WINDOWS MOBILE; a variety of UNIX®-flavored operating systems; or a proprietary operating system for computers or embedded systems. The application development platform or framework for the operating system 713 may be: BINARY RUNTIME ENVIRONMENT FOR WIRELESS® (BREW®); JAVA® Platform, Micro Edition (JAVA® ME) or JAVA® 2 Platform, Micro Edition (J2ME®) using the SUN MICROSYSTEMS® JAVASCRIPT® programming language; PYTHON™, FLASH LITE®, or MICROSOFT® .NET Compact, or another appropriate environment.

The device stores computer-executable code for the operating system 713, and the application programs 715 such as an email, instant messaging, a video service application, a mapping application word processing, spreadsheet, presentation, gaming, mapping, web browsing, JAVASCRIPT® engine, or other applications. For example, one implementation may allow a user to access the GOOGLE® GMAIL® email application, the GOOGLE® TALK® instant messaging application, a YOUTUBE® video service application, a GOOGLE® MAPS® or GOOGLE® EARTH® mapping application, or a GOOGLE® PICASA® imaging editing and presentation application. The application programs 715 may also include a widget or gadget engine, such as a TAFRI™ widget engine, a MICROSOFT® gadget engine such as the WINDOWS SIDEBAR® gadget engine or the KAPSULES™ gadget engine, a YAHOO! ® widget engine such as the KONFABULTOR™ widget engine, the APPLE® DASHBOARD® widget engine, the GOOGLE® gadget engine, the KLIPFOLIO® widget engine, an OPERA™ widget engine, the WIDSETS™ widget engine, a proprietary widget or gadget engine, or other widget or gadget engine the provides host system software for a physically-inspired applet on a desktop.

The navigation module 721 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 721 may also be used to measure angular displacement, orientation, or velocity of the device 600, such as by using one or more accelerometers.

Figure 8:
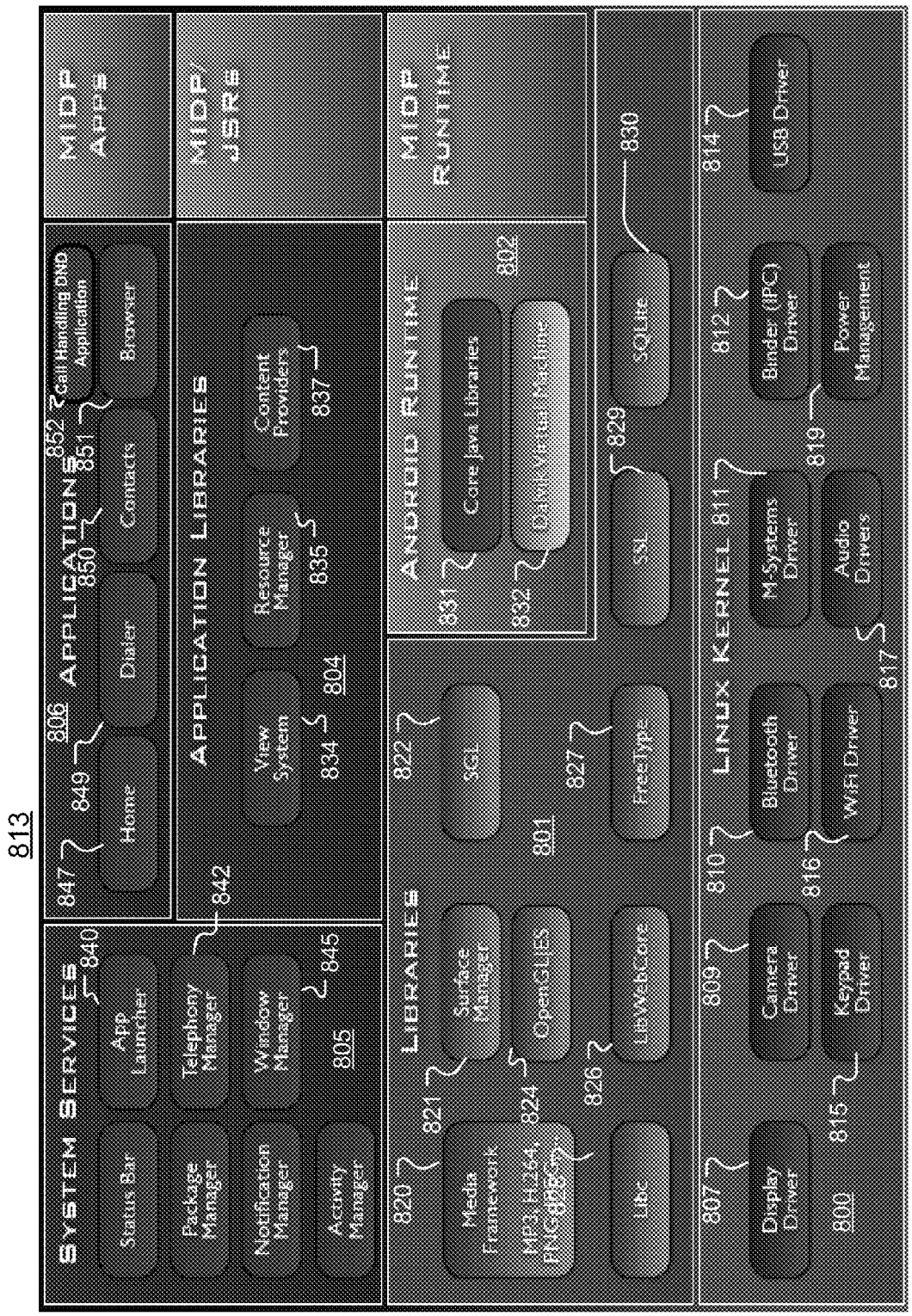
FIG. 8 is a block diagram illustrating exemplary components of the operating system used by the device of FIG. 6.

FIG. 8 is a block diagram illustrating exemplary components of the operating system 813 used by the device 800, in the case where the operating system 813 is the GOOGLE® ANDROID® operating system. The operating system 813 invokes multiple processes, while ensuring that the associated phone application is responsive, and that wayward applications do not cause a fault (or "crash") of the operating system. Using task switching, the operating system 813 allows for the switching of applications while on a telephone call, without losing the state of each associated application. The operating system 813 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 813 can generally be organized into six components: a kernel 800, libraries 801, an operating system runtime 802, application libraries 804, system services 805, and applications 806. The kernel 800 includes a display driver 807 that allows software such as the operating system 813 and the application programs 815 to interact with the display 601 via the display interface 802, a camera driver 809 that allows the software to interact with the camera 607; a BLUETOOTH® driver 810; a M-Systems driver 811; a binder (IPC) driver 812, a USB driver 814 a keypad driver 815 that allows the software to interact with the keyboard 602 via the keyboard interface 804; a WiFi driver 816; audio drivers 817 that allow the software to interact with the microphone 609 and the speaker 610 via the sound interface 809; and a power management component 819 that allows the software to interact with and manage the power source 819.

The BLUETOOTH® driver, which in one implementation is based on the BlueZ BLUETOOTH® stack for LINUX®-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH® driver provides JAVA® bindings for scanning, pairing and unpairing, and service queries.

The libraries 801 include a media framework 820 that supports standard video, audio and still-frame formats (such as Moving Picture Experts Group (MPEG)-4, H.264, MPEG-1 Audio Layer 8 (MP3), Advanced Audio Coding (AAC), Adaptive Multi-Rate (AMR), Joing Photographic Experts Group (JPEG), and others) using an efficient JAVA® Application Programming Interface (API) layer; a surface manager 821; a simple graphics library (SGL) 822 for two-dimensional application drawing; an Open Graphics Library for Embedded Systems (OpenGL ES) 824 for gaming and three-dimensional rendering; a C standard library (LIBC) 825; a LIBWEBCORE library 826; a FreeType library 827; an SSL 829; and an SQLite library 830.

The operating system runtime 802, which generally makes up a Mobile Information Device Profile (MIDP) runtime, includes core JAVA libraries 831, and a Dalvik virtual machine 832. The Dalvik virtual machine 832 is a custom, JAVA-compatible virtual machine that runs a customized file format (.DEX) as well as unmodified JAVA files (.CLASS/.JAR). With regard to graphics rendering, a system-wide composer manages surfaces and a frame buffer and handles window transitions, using the OpenGL ES 824 and two-dimensional hardware accelerators for its compositions.

The Dalvik virtual machine 832 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since fixed width instructions simplifies parsing, and since the 16-bit code units minimize reads.

The application libraries 804, which generally make up the MIDP JAVA® Specification Requests (JSRs), includes a view system 834, a resource manager 835, and content providers 837. The system services 805 includes a status bar 839; an application launcher 840; a package manager 841 that maintains information for all installed applications; a telephony manager 842 that provides an application level JAVA® interface to the telephony subsystem 820; a notification manager 844 that allows all applications access to the status bar and on-screen notifications; a window manager 845 that allows multiple applications with multiple windows to share the display 601; and an activity manager 846 that runs each application in a separate process, manages an application life cycle, and maintains a cross-application history.

The applications 806, which generally make up the MIDP applications, include a home application 847, a dialer application 849, a contacts application 850, a browser application 851, and a call handling DND application 852.

The telephony manager 842 provides event notifications (such as phone state, network state, Subscriber Identity Module (SIM) status, or voicemail status), allows access to state information (such as network information, SIM information, or voicemail presence), initiates calls, and queries and controls the call state. The browser application 851 renders web pages in a full, desktop-like manner, including navigation functions. Furthermore, the browser application 851 allows single column, small screen rendering, and provides for the embedding of HTML views into other applications.

Figure 9:
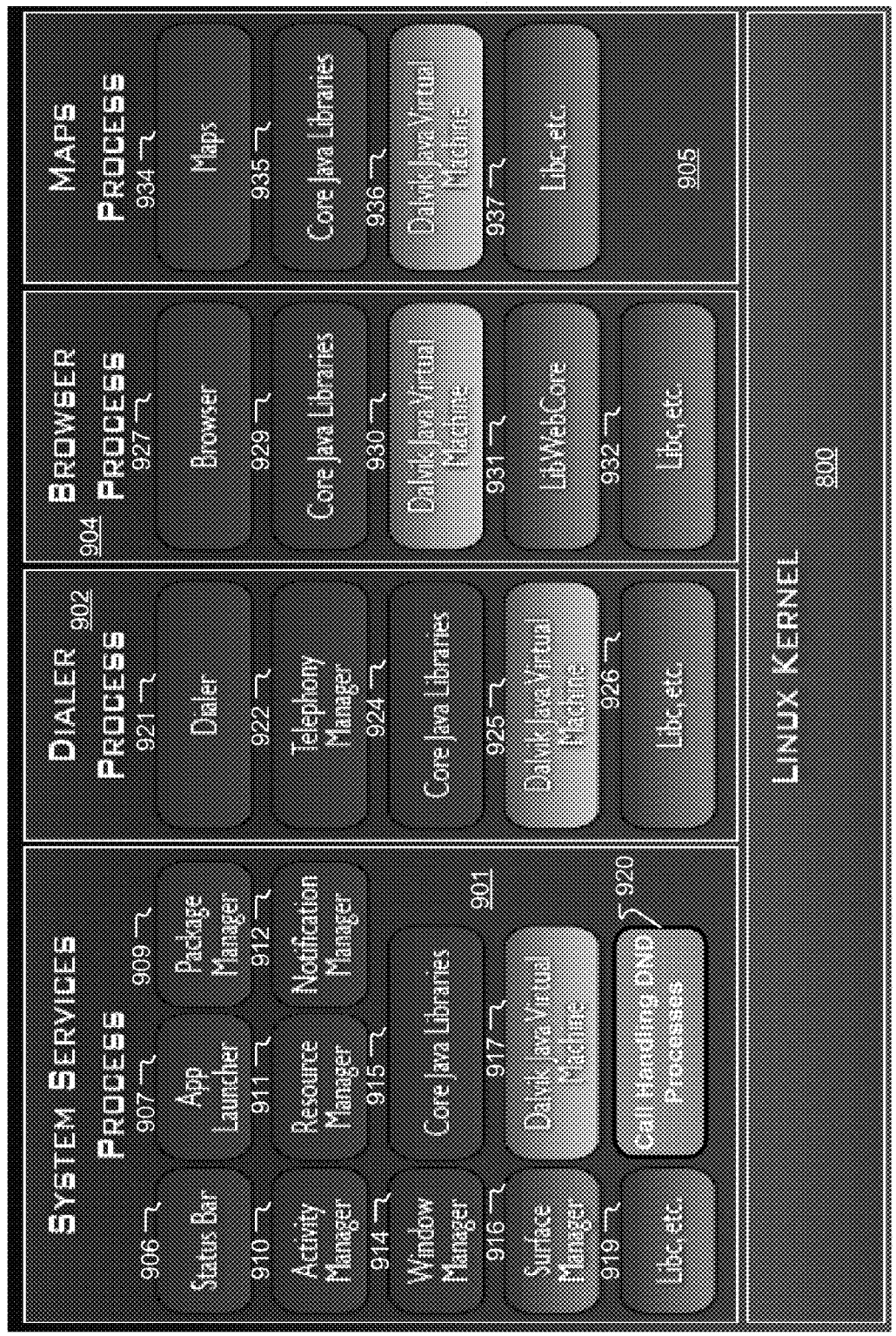
FIG. 9 is a block diagram illustrating exemplary processes implemented by the operating system kernel of FIG. 7.

FIG. 9 is a block diagram illustrating exemplary processes implemented by the operating system kernel 614. Generally, applications and system services run in separate processes, where the activity manager 846 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

The persistent core system services, such as the surface manager 916, the window manager 914, or the activity manager 910, are hosted by system processes, although application processes, such processes associated with the dialer application 921, may also be persistent. The processes implemented by the operating system kernel 614 may generally be categorized as system services processes 901, dialer processes 902, browser processes 904, and maps processes 905. The system services processes 901 include status bar processes 906 associated with the status bar 839; application launcher processes 907 associated with the application launcher 840; package manager processes 909 associated with the package manager 841; activity manager processes 910 associated with the activity manager 846; resource manager processes 911 associated with a resource manager that provides access to graphics, localized strings, and XML layout descriptions; notification manger processes 912 associated with the notification manager 844; window manager processes 914 associated with the window manager 845; core JAVA® libraries processes 915 associated with the core JAVA® libraries 831; surface manager processes 916 associated with the surface manager 821; Dalvik JAVA® virtual machine processes 917 associated with the Dalvik virtual machine 832, LIBC processes 919 associated with the LIBC library 825; and call handling DND processes 920 associated with the call handling DND application 852.

The dialer processes 902 include dialer application processes 921 associated with the dialer application 849; telephony manager processes 922 associated with the telephony manager 842; core JAVA® libraries processes 924 associated with the core JAVA® libraries 831; Dalvik JAVA® virtual machine processes 925 associated with the Dalvik Virtual machine 832; and LIBC processes 926 associated with the LIBC library 825. The browser processes 904 include browser application processes 927 associated with the browser application 851; core JAVA® libraries processes 929 associated with the core JAVA® libraries 831; Dalvik JAVA® virtual machine processes 930 associated with the Dalvik virtual machine 832; LIBWEBCORE processes 931 associated with the LIBWEBCORE library 826; and LIBC processes 932 associated with the LIBC library 825.

The maps processes 905 include maps application processes 934, core JAVA® libraries processes 935, Dalvik JAVA® virtual machine processes 936, and LIBC processes 937. Notably, some processes, such as the Dalvik JAVA® virtual machine processes, may exist within one or more of the systems services processes 901, the dialer processes 902, the browser processes 904, and the maps processes 905.

According to another general implementation, a computer program product is tangibly embodied in a machine-readable medium. The computer program product includes instructions that, when read by a machine, operate to cause a data processing apparatus to detect, upon receiving a telephone call, a selection of a control, and to determine a time increment associated with the selected control. The computer program product further includes instructions that, when read by the machine, operate to cause the data processing apparatus to activate a DND mode based on the selection, and to automatically deactivate the DND mode after the time increment has elapsed.

According to another general implementation, a device includes a input module and a processor. The input module is configured to detect, upon receiving a telephone call, a selection of a control. The processor is configured to determine a time increment associated with the selected control, to activate a DND mode based on the selection, and to automatically deactivate the DND mode after the time increment has elapsed.

Various other actions by a mobile device in response to an incoming call may also be based in part on a current location of the device. For example, if a user's work phone is located near the user's home and the user does not answer, the caller may be provided with a message saying that the user is at home. Also, if the caller is identified as a close acquaintance of the user, such as in the user's contact list, the caller may actual be told, via synthesized speech, the actual location of the user (e.g., zip code, town or even street address) and the caller's device may launch a mapping application that shows the location. In addition, a user may wish to use may receive poor wireless coverage at their home or elsewhere where another phone option is available (e.g., because they live at the bottom of a hill or in the middle of a large building), so that when an incoming call is received and the user is in such a non-operative location that has other calling options, the call may be automatically forwarded to the other options. As one example, a user may have all calls coming into her cell phone forwarded to her land-line connected business telephone wherever the cellular telephone recognizes that she is in the office. Such an approach may relieve the user of having to remember to manually institute call-forwarding.

By a similar approach, users may subscribe to one or more "no ring" zones. In particular, areas may be prescribed by various groups in which telephones are not supposed to ring. For example, churches, theatres, opera houses, and other similar organizations may register their geographic coordinates with a web site that may aggregate all such coordinates in an area or throughout the country. Illegitimate requests for silence may be edited out by a moderator or by other mechanisms. Users who want to be polite may then visit such a site and have their device download or otherwise reference the list of registered "no ring" zones. For those user who register, their telephones may be programmed to switch to vibrate mode or otherwise disable an audible ringer whenever the user passes into a no ring zone. Such a feature may also be turned off or otherwise disable by the user. Also, a user may download a full list of no ring zones, but may then edit the list, such as through a graphical user interface on a map. For instance, a user may initially download a global list of no ring zones, and then invalidate a zone for a church that is immediately adjacent to their workspace or that shares a wall with a coffee shop that the user frequents, for example.

Such location-based responses to calls may also be combined with operator-initiated responses to incoming calls like those discussed above. For example, a caller may be played a generic voice mail message if a callee does not answer when at work (as determined by GPS tracking in the callee's device). However, if the callee presses a snooze button on the device, slaps the device, or otherwise issues a similar command to the device, the caller may be provided with a different voice mail message. For example, if the callee issues such a command, their device may "read" to the caller whenever entry is currently in the callee's calendar. Such an occurrence may happen, for example, only if the callee's current locations matches a location correspondence to the current appointment. In this manner, if the callee sees that the caller is a stranger, she can let the call roll into normal voice mail. If the callee sees that the caller is a friend, she can let the caller know what she is currently doing, so that the caller can more readily decide whether to leave a message or call back.

The automatic deactivation of a DND mode for a telephonic mobile phone device has been described above in various example as being based upon a receiving a telephone call, as well as based upon a selection of a control. In a further implementation, the DND mode may be activated upon the occurrence of an event other than a telephone call, such as upon automatically determining that the callee is in a scheduled meeting, or is disposed in a physical location where it is inappropriate to receive telephone calls such as a hospital, movie theater, conference room, cemetery, library, or restaurant. In an additional implementation, the DND mode may automatically determine a time increment without detecting a selection of a control, such as by checking a callee's calendar or schedule to dynamically determine when the callee will be available to speak.

Figure 10:
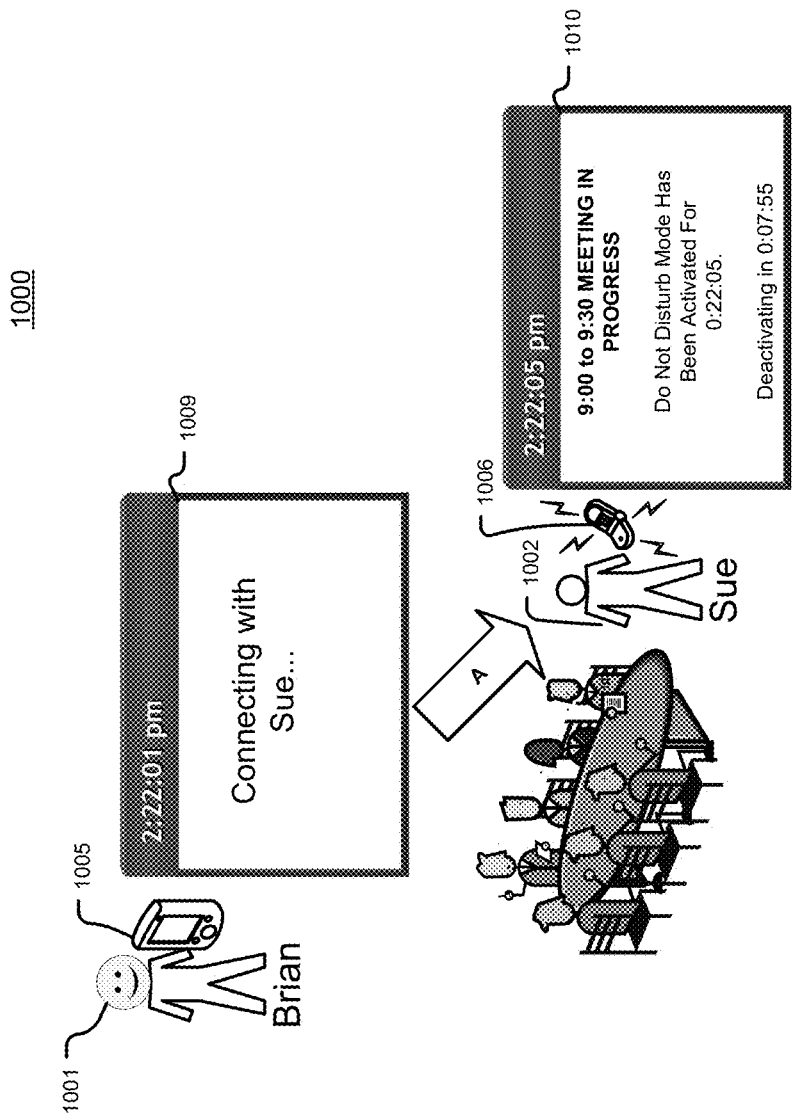
FIG. 10 is a conceptual diagram of a system for activating and deactivating a DND feature.
Figure 11:
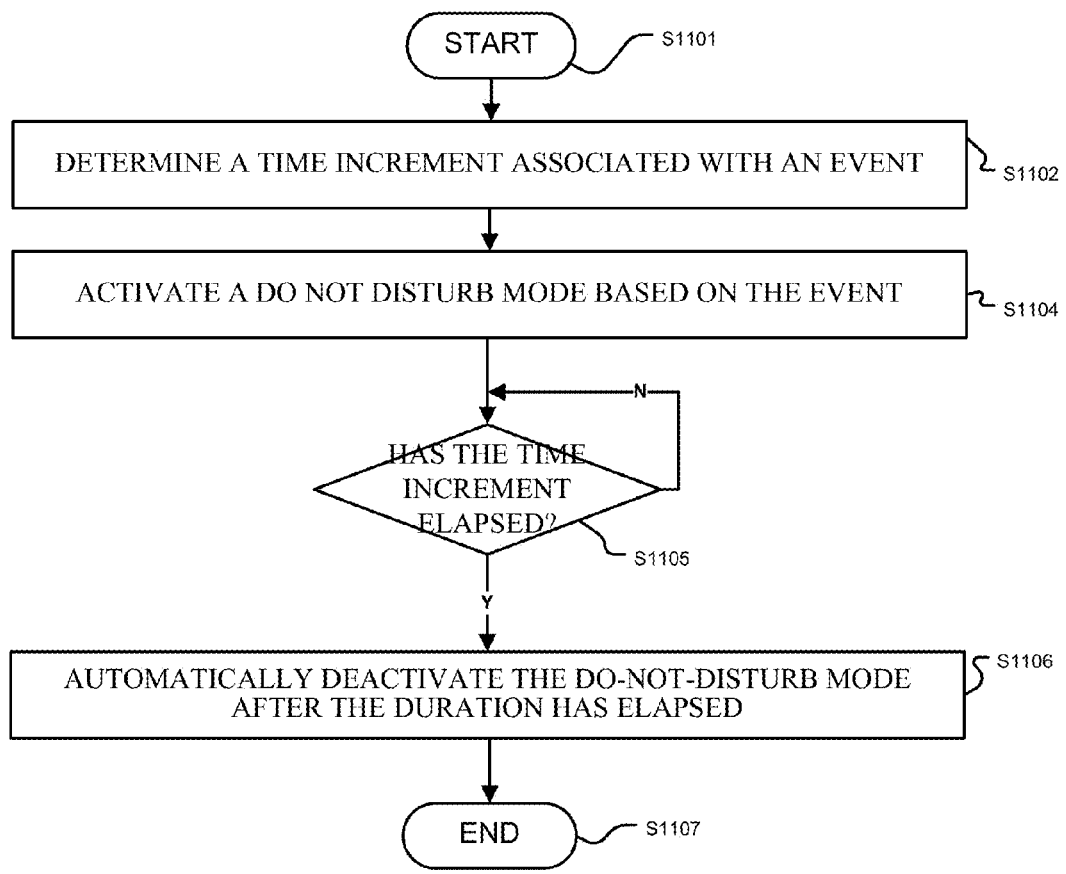
FIG. 11 is a flowchart illustrating an exemplary process.

FIG. 10 is a diagram that presents an overview of an exemplary system that provides for such an automatic deactivation of a DND mode for a telephonic mobile phone device 1006, without requiring a selection of a control. In FIG. 10, the called party 1002 (Sue) is in a meeting, and is thus unable to accept a telephone call.

When the process 1100 starts (S1101), an event is used to trigger the activation of the DND mode. For instance, a "location entry" event may be used to trigger the activation of the DND mode, based upon proximity to the relative or absolute coordinates of the conference room, the building that houses the conference room, or the city that houses the building. Additionally, a "meeting begin" event may be used to trigger the activation of the DND mode, using information from the called party's calendar to determine that a meeting has begun for which the called party is a participant. A "personal proximity" event may be used to trigger the activation of the DND mode based upon proximity to the mobile phone devices of certain people, such as Sue's boss or clients.

As the mobile device 1006 moves through various places, a database of locations is accessed to determine whether the "location entry" event has occurred. This determination may be made continuously, such as every few seconds, or it may occur non-periodically, such as when a call is initially received. The database may be a static database, such as a populated database of the geographic coordinates (i.e. latitude and longitude) of movie theaters, hospitals, houses-of-worship, libraries, cemeteries, or other quiet zones, or the database may be populated by the user. For instance, if the user enjoys walking undisturbed in a particular park, they may select a control labeled "never receive calls at this location" while on their walk, to prevent the mobile device 1006 from receiving calls at that location in the future.

In an additional implementation, the event may be a "bad time" begin event, based upon learning the called party's phone habits. For instance, if the user always rejects calls between 9 and 10 pm on Thursday nights, the mobile device 1006 may map this behavior to a "bad time" begin event, and prevent calls from being received during that time, even thought the user may not have an appointment scheduled.

Any number of other events for myriad business and social contexts could be used to automatically trigger a DND mode. A time increment associated with the event is determined (S1102), and the DND mode is activated (S1104). This time increment may be a preset time increment, or a dynamically determined time increment based on an expected time when the called party 1002 will be able to use the mobile device 1006. This time increment, or a remaining time increment, may be displayed on the user interface 1010.

When, as displayed in user interface 1009, the calling party 1001 (Brian) initiates a telephone call using personal digital assistant 1005, to call the mobile phone device 1006 of the called party 1002 (Sue). As illustrated in FIG. 10, a user interface 1010 rendered on the mobile phone device 1006 before or after the call is received, the user interface 1010 indicating that a meeting is in progress, an elapsed time since the DND mode was activated, and a time remaining until the DND mode is automatically deactivated. If the DND mode were activated based on an event other than a "meeting begin" event, another message may be displayed based on the context of the event activating the DND mode. For instance, the user interface 1010 might display "Quiet Zone Entered" or "VIPs are nearby," if the triggering event were a "location entry" event or a "personal proximity" event, respectively.

If the time increment has not yet elapsed (S1105), the DND mode remains activated. If the time increment has elapsed (S1105), the DND mode is automatically deactivated (S1106), and the process 1100 ends (S1107).

A number of implementations have been described. Nevertheless, it will be understood that various modifications may be made without departing from the spirit and scope of the disclosure. Accordingly, other implementations are within the scope of the following claims.

What is claimed is:

1. A computer readable storage device comprising instructions that, when executed by a mobile device, cause the mobile device to perform operations comprising:
   receiving, by the mobile device, a telephone call;
   determining, by the mobile device, a current time;
   determining, by the mobile device and based on a user's past interactions with the mobile device, that the user has previously rejected one or more other telephone calls received during a particular time period that encompasses the current time; and
   based on determining that the user typically rejects has previously rejected one or more other telephone calls received during the particular time period that encompasses the current time, automatically rejecting the telephone call.

2. The device of claim 1, wherein determining, by the mobile device and based on a user's past interactions with the mobile device, that the user has previously rejected one or more other telephone calls received during a particular time period that encompasses the current time comprises:
   determining a current geographic location of the mobile device; and
   determining that the user has previously rejected one or more other telephone calls received during the particular period that encompasses the current time, when at the current geographic location.

3. The device of claim 2, wherein the operations comprise determining that the user has previously rejected one or more other telephone calls received during the particular period that encompasses the current time, when at the current geographic location, comprises determining that the user has selected a control associated with automatically rejecting future telephone calls, when previously visiting the geographic location.

4. The device of claim 1, wherein determining, by the mobile device and based on a user's past interactions with the mobile device, that the user has previously rejected one or more other telephone calls received during a particular time period that encompasses the current time comprises determining that the particular time period is classified as a 'bad time' time period.

5. The device of claim 1, wherein determining, by the mobile device and based on a user's past interactions with the mobile device, that the user has previously rejected one or more other telephone calls received during a particular time period that encompasses the current time comprises:
   determining a current day of the week; and
   determining that the user has previously rejected one or more other telephone calls received during a particular time period that encompasses the current time, on the current day of the week.

6. The device of claim 1, wherein the operations comprise:
   determining that a caller that initiated the telephone call is not included among a set of contacts that are authorized by a user of the mobile device to override a rejection of a telephone call;
   wherein the telephone call is automatically rejected further based on determining that the caller that initiated the telephone call is not included among a set of contacts that are authorized by the user of the mobile device to override a rejection of a telephone call.

7. The device of claim 1, wherein determining that the user has previously rejected one or more other telephone calls received during the particular period that encompasses the current time comprises:
   determining that another particular mobile device is detected within a predefined proximity of the mobile device; and
   determining that the user has previously rejected one or more other telephone calls received during the particular period that encompasses the current time, when the other particular mobile device is detected within a predefined proximity of the mobile device.

8. The device of claim 1, wherein determining that the user has previously rejected one or more other telephone calls received during the particular time period that encompasses the current time comprises:
   determining that the user previously interacted with the mobile device, at a time within the particular time period, to reject a telephone call received at the mobile device.

9. The device of claim 1, wherein determining that the user has previously rejected one or more other telephone calls received during the particular time period that encompasses the current time comprises:
   determining that the user's past interactions with the mobile device include a pattern of user actions rejecting telephone calls during the particular time period.

10. The device of claim 1, wherein determining that the user has previously rejected one or more other telephone calls received during the particular time period that encompasses the current time comprises:
    determining that, upon receiving a previous telephone call at the mobile device during the particular time period on a previous day, the user selected a control causing the mobile device to be silenced without accepting the previous telephone call.

11. A computer-implemented method comprising:
    receiving, by a mobile device, a telephone call;
    determining, by the mobile device, a current time;
    determining, by a mobile device and based on a user's past interactions with the mobile device, that the user has previously rejected one or more other telephone calls received during a particular time period that encompasses the current time; and based on determining that the user has previously rejected one or more other telephone calls received during the particular time period that encompasses the current time, automatically rejecting the telephone call.

12. The method of claim 11, wherein determining, by the mobile device and based on a user's past interactions with the mobile device, that the user has previously rejected one or more other telephone calls received during a particular time period that encompasses the current time comprises:
   determining a current geographic location of the mobile device; and
   determining that the user has previously rejected one or more other telephone calls received during the particular period that encompasses the current time, when at the current geographic location.

13. The method of claim 12, wherein determining that the user has previously rejected one or more other telephone calls received during the particular period that encompasses the current time, when at the current geographic location, comprises determining that the user has selected a control associated with automatically rejecting future telephone calls, when previously visiting the geographic location.

14. The method of claim 11, wherein determining, by the mobile device and based on a user's past interactions with the mobile device, that the user has previously rejected one or more other telephone calls received during a particular time period that encompasses the current time comprises determining that the particular time period is classified as a 'bad time' time period.

15. The method of claim 11, wherein determining, by the mobile device and based on a user's past interactions with the mobile device, that the user has previously rejected one or more other telephone calls received during a particular time period that encompasses the current time comprises:
   determining a current day of the week; and
   determining that the user has previously rejected one or more other telephone calls received during a particular time period that encompasses the current time, on the current day of the week.

16. The method of claim 11, wherein determining that a caller that initiated the telephone call is not included among a set of contacts that are authorized by a user of the mobile device to override a rejection of a telephone call;
   wherein the telephone call is automatically rejected further based on determining that the caller that initiated the telephone call is not included among a set of contacts that are authorized by the user of the mobile device to override a rejection of a telephone call.

17. The method of claim 11, wherein determining that the user has previously rejected one or more other telephone calls received during the particular period that encompasses the current time comprises:
   determining that another particular mobile device is detected within a predefined proximity of the mobile device; and
   determining that the user has previously rejected one or more other telephone calls received during the particular period that encompasses the current time, when the other particular mobile device is detected within a predefined proximity of the mobile device.

18. A system comprising:
   one or more processors and one or more storage devices storing instructions that are operable, when executed by the one or more processors, to cause the one or more processors to perform operations comprising:
   receiving, by a mobile device, a telephone call;
   determining, by the mobile device, a current time;
   determining, by a mobile device and based on a user's past interactions with the mobile device, that the user has previously rejected one or more other telephone calls received during a particular time period that encompasses the current time; and
   based on determining that the user has previously rejected one or more other telephone calls received during the particular time period that encompasses the current time, automatically rejecting the telephone call.

19. The system of claim 18, wherein determining, by the mobile device and based on a user's past interactions with the mobile device, that the user has previously rejected one or more other telephone calls received during a particular time period that encompasses the current time comprises:
   determining a current geographic location of the mobile device; and
   determining that the user has previously rejected one or more other telephone calls received during the particular period that encompasses the current time, when at the current geographic location.

20. The system of claim 19, wherein the operations comprise determining that the user has previously rejected one or more other telephone calls received during the particular period that encompasses the current time, when at the current geographic location, comprises determining that the user has selected a control associated with automatically rejecting future telephone calls, when previously visiting the geographic location.

21. The system of claim 18, wherein determining, by the mobile device and based on a user's past interactions with the mobile device, that the user has previously rejected one or more other telephone calls received during a particular time period that encompasses the current time comprises determining that the particular time period is classified as a 'bad time' time period.

22. The system of claim 18, wherein determining, by the mobile device and based on a user's past interactions with the mobile device, that the user has previously rejected one or more other telephone calls received during a particular time period that encompasses the current time comprises:
   determining a current day of the week; and
   determining that the user has previously rejected one or more other telephone calls received during a particular time period that encompasses the current time, on the current day of the week.

23. The system of claim 18, wherein the operations comprise:
   determining that a caller that initiated the telephone call is not included among a set of contacts that are authorized by a user of the mobile device to override a rejection of a telephone call;
   wherein the telephone call is automatically rejected further based on determining that the caller that initiated the telephone call is not included among a set of contacts that are authorized by the user of the mobile device to override a rejection of a telephone call.

24. A computer readable storage device comprising instructions that, when executed by a data processing apparatus, cause the data processing apparatus to perform operations comprising:
   receiving, by a mobile device, a telephone call;
   determining, by the mobile device, a current time;
   determining, by the mobile device and based on a user's past interactions with the mobile device, that the user typically rejects telephone calls received during a particular time period that encompasses the current time, wherein determining that the user typically rejects telephone calls received during the particular period that encompasses the current time comprises:
    determining that another particular mobile device is detected within a predefined proximity of the mobile device; and
    determining that the user typically rejects telephone calls received during the particular period that encompasses the current time, when the other particular mobile device is detected within a predefined proximity of the mobile device; and
based on determining that the user typically rejects telephone calls received during the particular time period that encompasses the current time, automatically rejecting the telephone call.

* * * * *